United States Patent [19]

Cha

[11] Patent Number: 5,311,331
[45] Date of Patent: May 10, 1994

[54] IMAGE SCANNING AND VIDEO PRINTING APPARATUS AND METHOD OF CONTROLLING THE SAME

[75] Inventor: Dong-Ill Cha, Suwon, Rep. of Korea

[73] Assignee: SamSung Electronics Co., Ltd., Suwon, Rep. of Korea

[21] Appl. No.: 770,235

[22] Filed: Oct. 3, 1991

[30] Foreign Application Priority Data

Oct. 20, 1990 [KR] Rep. of Korea ............... 1990-16792

[51] Int. Cl.⁵ .................. H01N 1/21; H01N 1/23; H01N 1/32
[52] U.S. Cl. ......................... 358/501; 358/513; 358/524; 358/401; 358/404; 358/412; 358/444; 358/445; 358/468; 358/483; 358/401; 358/404; 358/412; 358/444; 358/445; 358/468; 358/483
[58] Field of Search ............ 358/75, 483, 213.13, 358/296, 451, 444, 404, 445, 501, 513, 524, 409, 412, 468, 401

[56] References Cited

U.S. PATENT DOCUMENTS

| | | | |
|---|---|---|---|
| 4,306,093 | 12/1981 | Nasu | 358/451 |
| 4,442,452 | 4/1984 | Kurata et al. | 358/75 |
| 4,680,626 | 7/1987 | Deering et al. | 358/75 |
| 4,686,572 | 8/1987 | Takatsu | 358/213.13 |

Primary Examiner—Edward L. Coles, Sr.
Assistant Examiner—Scott A. Rogers
Attorney, Agent, or Firm—Robert E. Bushnell

[57] ABSTRACT

There is disclosed an image scanning and video printing apparatus comprising a video printing unit controlled by a video synchronization signal, printing control signal and memory control signal for printing the images corresponding to a first video signal received through a first video signal input terminal and a second video signal produced by an image scanning on a printing paper, and generating a monitoring video signal, an image scanning unit for scanning a given material by an sensing device in response to an image sensing device drive control signal for controlling the driving of the image sensing device and image sensing device transfer control signal for controlling the transferring of the image sensing device so as to produce the second video signal supplied to the video printing unit, and a system control unit for controlling the image scanning and video printing apparatus by providing the image sensing device drive control signal and the image sensing device transfer control signal for the image scanning unit, and the video synchronization signal, memory control signal and printing control signal for the video printing unit.

17 Claims, 5 Drawing Sheets

IMAGE SCANNING AND VIDEO PRINTING APPARATUS AND METHOD OF CONTROLLING THE SAME

BACKGROUND OF THE INVENTION

The present invention relates to a video color printer, and particularly to a video color printer provided with a device for scanning a material such as photographs, books, magazines, etc.

There has been an increasing need for an apparatus for printing a video signal of a video system on a printing paper. A video color printer is widely used for printing video signals of VTRs (video tape recorders), camcorders (camera recorders), TVs, etc. In addition, a color scanner printer is used for printing video signals produced by an image scanner to scan a material such as books, photographs, magazines, etc.

Figure 1:
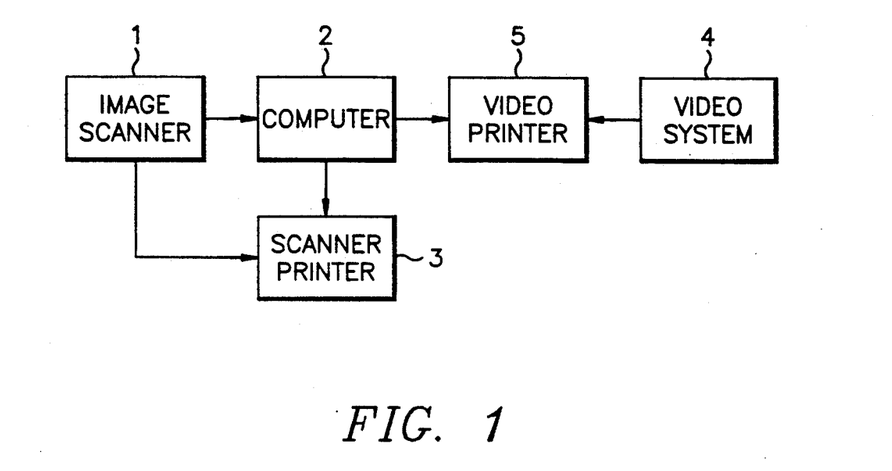
FIG. 1 illustrates a conventional system for printing video signals produced by a video system and by scanning a material such as a book.

Referring to FIG. 1, there is shown a system for printing a video signal produced by video system or image scanner comprising an image scanner 1, computer 2, scanner printer 3, video system 4 and video printer 5. The video system 4 may be a VTR, camcorder, TV, etc. In this system, the video printer 5 prints the video signal of video system on a printing paper. The image scanner 1 scans a material such as books, photographs, magazines, etc. with an image sensing device, and scanner printer 3 to print video signals produced by the image scanner 1 or processed by the computer 2.

The image sensing device may be generally a line transferring CCD or interline transferring CCD for NTSC. The line transferring CCD scans lines of a material one by one, while the interline transferring CCD scans at once the full extent of a material by using a shutter.

Meanwhile, in order to print a material such a photograph, book, magazine, etc. with a video printer 5, the material should be scanned by the image scanner 1 to generate corresponding video signals processed by the computer 2 for printing with the video printer 5.

As stated above, the conventional system for printing video signals produced by various video systems or obtained by scanning a material such as a photograph, book, magazine, etc. must be simultaneously provided with a video printer and scanner printer, or a video printer, image scanner and computer.

SUMMARY OF INVENTION

It is an object of the present invention to provide an image scanning and video printing apparatus and method of controlling the same, whereby video signals produced by various video systems or by scanning a material such a photograph, book, magazine, etc. are printed.

It is another object of the present invention to provide an image scanning and video printing apparatus and method of controlling the same, wherein the image sensing device for scanning the material may be a line transferring CCD or interline transferring CCD.

It is still another object of the present invention to provide an image scanning and video printing apparatus and method of controlling the same, wherein the interline transferring CCD scans at once the full extent of a material by using a shutter sequentially transmitting corresponding video data according to the capacity of a picture memory, so as to store the video data of one frame in picture memory.

It is still another object of the present invention to provide an image scanning and video printing apparatus, wherein one line transferring distance of the line transferring CCD and data sampling position are determined according to the size of the material to be scanned with reference to the defined size of a printing paper and the capacity of a picture memory, and the region except the size of the material is dummied.

According to one aspect of the present invention, an image scanning and video printing apparatus comprises: a first video signal input terminal for receiving a video signal output from a video system as a first video signal; a video decoder for decoding the first video signal to produce red, green and blue (R, G and B) video signals and separating the vertical synchronizing signal and horizontal synchronizing signal from the first video signal; a memory control circuit for receiving the vertical and horizontal synchronizing signals to generate analog/digital conversion sampling pulses, write address signal and write signal, and for receiving a printing signal to generate read address signal and read signal, the memory control circuit being controlled by a video synchronization signal and memory control signal; an analog/digital converter (A/D converter) for selectively converting the first R, G and B video signals or second R, G and B signals in response to the A/D conversion sampling pulses so as to generate R, G and B video data; a picture memory with a given memory space for storing the R, G and B video data in response to the write address signal and write signal in order to output the stored R, G and B video data in response to the read address signal and read signal when there has been stored the R, G and B data of one frame; a printing control circuit for producing a printing signal, video data selection signal, line memory control signal, intermediate tone control signal and printing drive signal in response to a printing control signal; a multiplexer for sequentially outputting the R, G and B video data of the picture memory in the order of B, G and R in response to the video data selection signal; a line memory for transforming the video data in the order of B, G and R into vertical video data in response to the line memory control signal; an intermediate tone control circuit for transforming in color the vertical video data in response to the intermediate tone control signal so as to produce a printing data of yellow, magenta and cyan (Y, M and C); a print head circuit for printing a frame on a printing paper according to the printing drive signal and printing data; a video encoder for encoding R, G and B video data output from the picture memory into a monitoring video signal; an image scanning unit for scanning a given material by an image sensing CCD in response to a CCD drive control signal for controlling the driving of the CCD and CCD transfer control signal for controlling the transferring of the CCD so as to produce the second video signal supplied to the A/D converter; and a system control unit for controlling the image scanning and video printing apparatus by providing the CCD drive control signal and CCD transfer control signal for the image scanning unit, the video synchronization signal and memory control signal for the memory control circuit, and the printing control signal for the printing control circuit, thereby scanning the given material so as to print in a given size.

DETAILED DESCRIPTION OF THE PREFERRED EMBODIMENTS

Figure 2:
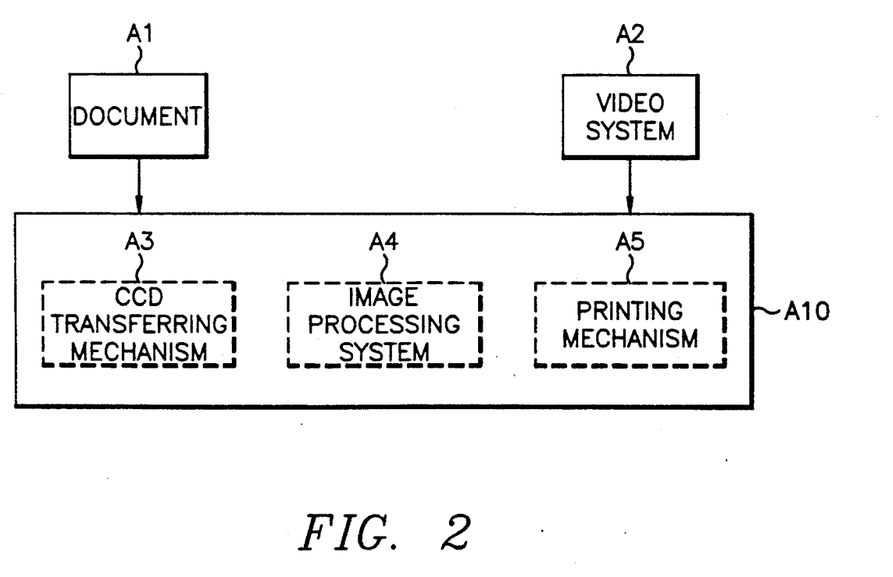
FIG. 2 illustrates an image scanning and video printing apparatus according to the present invention.

Referring to FIG. 2, the image scanning and video printing apparatus comprises a charge coupled device (hereinafter referred to as "CCD") transferring mechanism A3 for scanning a material A1 to produce corresponding video signals, a video system A2 for producing a video signal, an image processing system A4 for processing the video signals, and a printing mechanism A5 for printing an image corresponding to the video signals. In this case, the image processing system A4 and printing mechanism A5 are those used in the conventional video printer.

Figure 3:
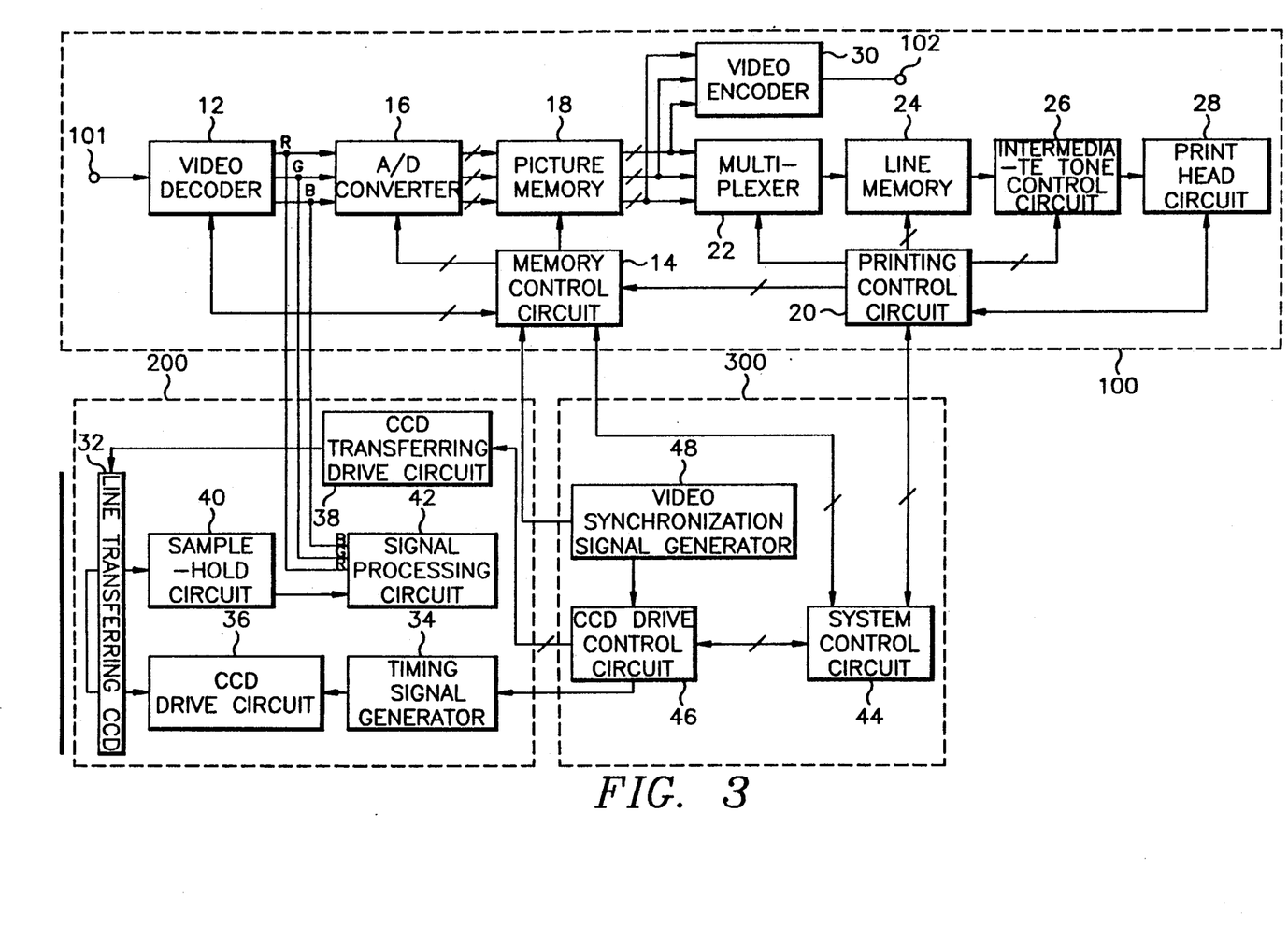
FIG. 3 is a block diagram for illustrating an embodiment of the present invention.

According to an embodiment of the present invention as shown in FIG. 3, the image scanning and video printing apparatus comprises a video printing unit 100 controlled by a video synchronization signal, a printing control signal and memory control signal for printing the images corresponding to a first video signal received through a first video signal input terminal 101 and a second video signal produced by an image scanning on a printing paper, and generating a monitoring video signal, an image scanning unit 200 for scanning a given material by an image sensing CCD in response to a CCD drive control signal for controlling the driving of the CCD and CCD transfer control signal for controlling the transferring of the CCD so as to produce the second video signal supplied to the video printing unit 100, and a system control unit 300 for controlling the image scanning and video printing apparatus by providing the CCD drive control signal and CCD transfer control signal for the image scanning unit 200, and the video synchronization signal, memory control signal and printing control signal for the video printing unit 100.

Referring to FIG. 3, the video printing unit 100 is described specifically.

The first video signal input terminal 101 receives a video signal output from a video system as a first video signal. A video decoder 12 decodes the first video signal to produce R, G and B video signals and separate the vertical synchronizing signal and horizontal synchronizing signal from the first video signal. A memory control circuit 14 receives the vertical and horizontal synchronizing signals to generate analog/digital conversion sampling pulses, write address signal and write signal, and also receives a printing signal to general a read address signal and a read signal. The memory control circuit is controlled by the video synchronization signal and memory control signal of the system control unit 300. An analog/digital converter (A/D converter) 16 selectively converts the first R, G and B video signals or second R, G and B signals in response to the A/D conversion sampling pulses so as to generate R, G and B video data.

A picture memory 18 with a given memory space stores the R, G and B video data in response to the write address signal and write signal in order to output the stored R, G and B video data in response to the read address signal and read signal when there has been stored the R, G and B data of one frame. A printing control circuit 20 produces a printing signal, video data selection signal, line memory control signal, intermediate tone control signal and printing drive signal in response to the printing control signal of the system control unit 300. A multiplexer 22 sequentially outputs the R, G and B video data of the picture memory 18 in the order of B, G and R in response to the video data selection signal. A line memory 24 transforms the video data in the order of B, G and R into vertical video data in response to the line memory control signal.

An intermediate tone control circuit 26 transforms in color the vertical video data in response to the intermediate tone control signal so as to produce a printing data of yellow, magenta and cyan (Y, M and C). A print head circuit 28 prints a frame on a printing paper according to the printing drive signal and printing data. A video encoder 30 encodes the R, G and B video data output from the picture memory 18 into a monitoring video signal outputted through a monitoring signal output 102.

The construction of the video printing unit 100 is the same as the conventional one.

In the image scanning unit 200, a line transferring CCD 32 scans the given material in response to a CCD drive signal and CCD transferring drive signal. A timing signal generator 34 generates a CCD drive timing signal for timing the drive of the line transferring CCD 32. A CCD drive circuit 36 generates a CCD drive signal for driving the line transferring CCD 32 in response to the CCD drive timing signal. A CCD transferring drive circuit 38 generates the CCD transferring drive signal for transferring the line transferring CCD 32 in response to the CCD transfer control signal of the system control unit 300. A sample and hold circuit 40 samples and holds the scanned video signal of the line transferring CCD 32. A signal processing circuit 42 processes the sampled and held video signal into the second R, G and B signals.

The system control unit 300 comprises a system control circuit 44 for generating the memory control signal, printing control signal and CCD control signal, thus controlling the whole system of the image scanning and video printing apparatus, a CCD drive control circuit 46 for generating the CCD transfer control signal, CCD drive control signal and synchronization control signal in response to the CCD control signal, and a video synchronization signal generator 48 for generating the video synchronization signal in response to the synchronization control signal.

Figure 4:
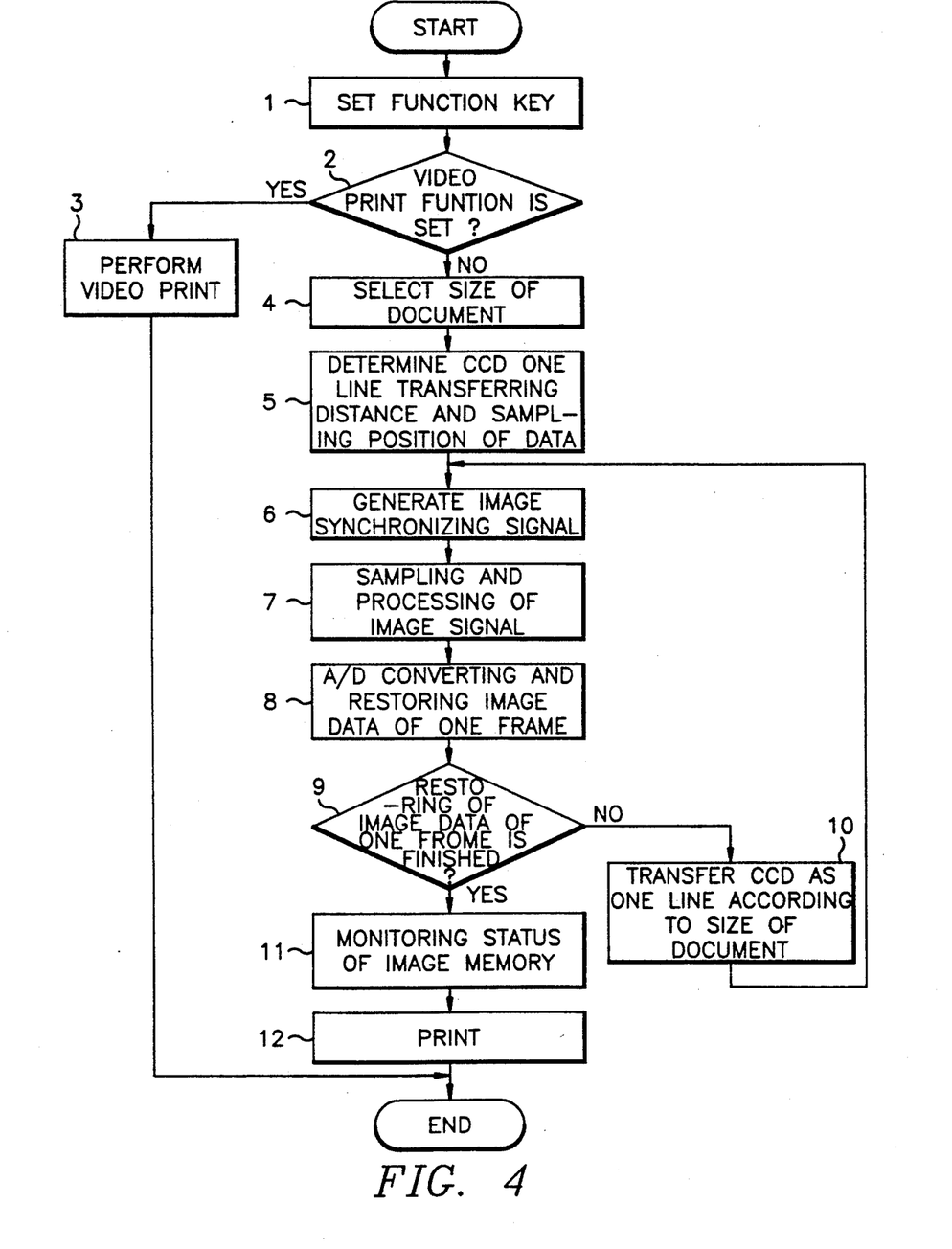
FIG. 4 is a flow chart for illustrating the inventive method.

Referring to FIG. 4, the method of controlling the inventive image scanning and video printing apparatus comprises the following steps:

(a) selecting one of the functions of the apparatus;

(b) performing video printing function if the selected function is the video printing;

(c) selecting the size of a material to be scanned and determining one line transferring distance and data sampling position according to the capacity of the picture memory and the size of the material to be scanned if the selected function is the scanning printing;

(d) scanning the material with the CCD according to the determined one line transferring distance by generating a video synchronization signal, sampling the scanned video signal according to the determined data sampling position, processing the sampled video signal, and subjecting the processed signal to A/D conversion, so as to store the data of one horizontal line in the picture memory;

(e) checking whether the video data of one frame has been stored in the picture memory;

(f) transferring the CCD by the determined one line according to the size of the material if the video data of one frame has not yet been stored in the picture memory, and repeating the step (d) until the video data of one frame has been stored in the picture memory; and (g) monitoring and printing the video data when the video data of one frame has been stored in the picture memory.

The above steps are performed by the circuit shown in FIG. 3, and the video printing procedure is the same as the conventional one.

Figure 5:
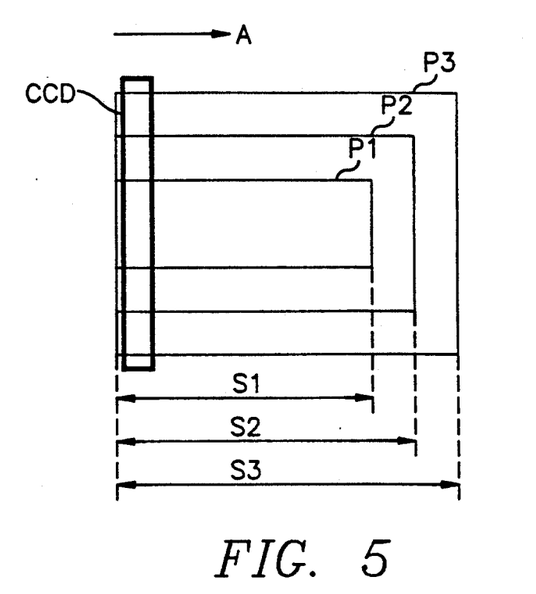
FIG. 5 illustrates CCD transferring distance according to the size of a material in the operation of the inventive apparatus of FIG. 3.

Referring to FIG. 5, the transferring distance S1, S2, in the direction of A of the CCD differs according to the size of the material to be scanned.

Figure 6:
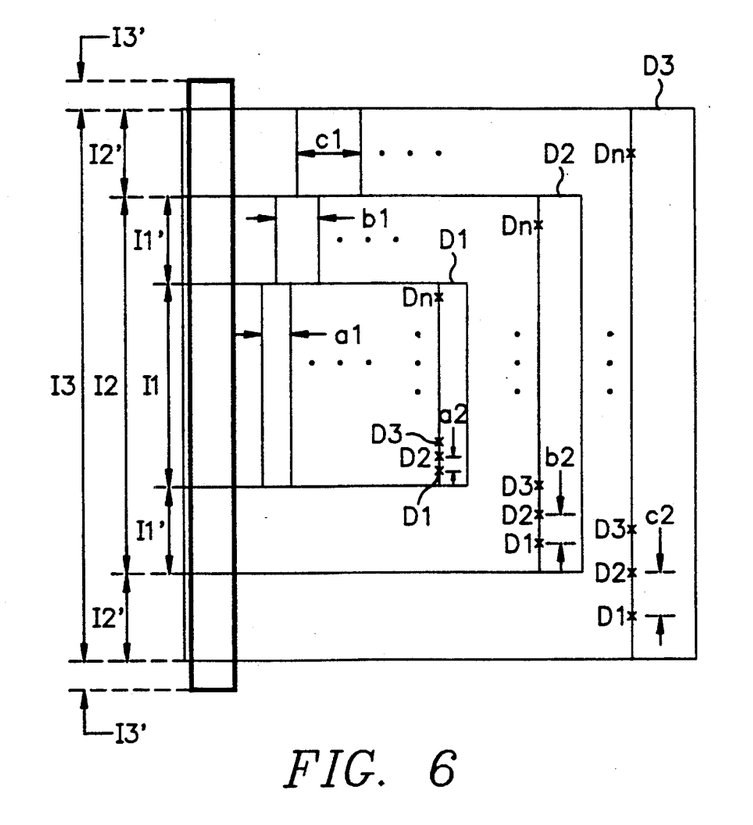
FIG. 6 illustrates the data sampling according to the size of a material in the operation of the inventive apparatus of FIG. 3.

Referring to FIG. 6, there is shown a one line transferring distance a1, b1, c1 of the CCD, the sampling interval a2, b2, c2 of data (D1,D2 . . . Dm), the video effective interval (I1, I2, I3), an the dummying interval (I1′, I2′, I3′) with reference to the capacity of the picture memory and the size of a printing paper according to the size (P1, P2, P3) of the material to be scanned.

Hereinafter, the operation of the image scanning and video printing apparatus according to the present invention is described with reference to FIGS. 3 to 6.

First, When the first video signal is received through the first video signal input terminal 101, the system control circuit 44 generates the memory control signal to the memory control circuit 14 to print the image corresponding to the first video signal, and provides the printing control signal to the printing control circuit 20 controlling the video printing unit 100. The video decoder 12 decodes the first video signal such as NTSC signal into R, G, and B video signals, and simultaneously separates the vertical and horizontal synchronizing signals from the first video signal. The memory control circuit 14 receives the vertical and horizontal synchronizing signals so as to deliver the A/D conversion sampling pulse to the A/D converter 16 in response to the memory control signal, and transfers the write address signal and write signal, and the read address signal and read signal to the picture memory 18.

Accordingly, the R, G, and B video signals are converted by the A/D converter 16 into the digital R, G, and B video data stored in the picture memory in response to the write address signal and write signal.

The picture memory 18 usually has the storage capacity of one field or frame data, so that if the R, G, and B video data of one field or frame is stored into the picture memory 18, the R, G, and B video data of one frame is applied to the multiplexer 22 and video encoder 30 in response to the read address signal and read signal.

Meanwhile, the printing control circuit 20 outputs the video data selection signal to the multiplexer 22 in response to the printing control signal. The multiplexer 22 outputs the R, G, and B video data to the line memory 24 in the order of B, G, and R. The line memory 24 transforms the video data received in the order of B, G, and R into the vertical video data in response to the line memory control signal of the printing control circuit 20. The reason for this is that there exists a difference between the video data processing speed and the printing speed of the print head circuit 28, and the video data is horizontally stored in the picture memory 18, so that the vertical data should be retrieved in order to perform printing by horizontally moving the head from the left to the right of the frame.

Thus, the line memory 24 generates the vertical video data, and the intermediate tone control circuit 26 transforms in color the vertical B, G, and R video data into Y, M, and C data in response to the intermediate control signal. The Y, M, and C data is delivered to the print head circuit 28, which drives the print head in response to the printing drive signal to print the image corresponding to the video data.

Referring to FIG. 4, the operational steps of the circuit of FIG. 3 will now be described.

With the power on in the step (1), the function selection key is input for selecting the video print or scanning print function. If the key input represents the video print function, the conventional video print function is performed in step (3).

If the key input represents the scanning print function, the size of the material to be scanned is selected in step (4). Namely, as shown in FIG. 4, the user selects one of the first, second and third materials P1, P2 and P3 having different sizes. Here, the sizes of the first to third materials P1-P3 may be respectively A6, A5 and A4.

In step (5), according to the size of the selected material, the one line transferring distance of the line transferring CCD 32 and the data sampling position for the video signal are determined. In this case, the one line transferring distance and the sampling position differ according to the size of the selected material, the capacity of the picture memory and the size of the printing paper. Namely, as shown in FIG. 5, since the transferring distance (S1, S2, S3) of the line transferring CCD 32 and the number of the scanned picture elements vary with the size (P1, P2, P3) of the scanned material, the one line transferring distance and the data sampling position for the video signal should be determined according to the capacity of the picture memory and the size of the printing paper.

Hence, if the capacity of the picture memory and the printing paper is determined for the size of the first material P1, the one line transferring distance and data sampling position should be determined according to the size of the selected one of the first to third materials P1 to P3 with reference to the first material P1.

For example, if the printing paper is determined to have the same size as the first material Pi, and the first material P1 is to be scanned, the one line distance of the line transferring CCD is a1 as shown in FIG. 6, and the sampling interval of the data D1,D2 . . . Dm for the video signal a2. In this case, the image effective interval is I1, and the dummying interval is I1'.

If the printing paper is determined to have the same size as the first material P1, and the second material P2 is to be scanned, the one line distance of the line transferring CCD 32 is b1 as shown in FIG. 6, the data sampling interval is b2. In this case, the image effective interval is I2, and the dummying interval is I2'.

If the printing paper is determined to have the same size as the first material P1, and the third material P3 is to be scanned, the one line transferring distance of the line transferring CCD 32 is c1 as shown in FIG. 6, and the data sampling interval is c2. In this case, the image effective interval is I3, and the dummying interval is I3'.

Thus, if the printing paper is determined to have the same size as the first material P1, and the one line transferring distance a1, b1, c1 of the line transferring CCD 32 and the data sampling interval a2, b2, c2 are determined, the second and third materials P2 and P3 are printed in the reduced size of the first material P1. In this case, the number of the transferring lines and the number of the sampling data are the video data for a single frame, and vary with the printing method.

In step (6), the system control circuit 44 delivers the memory control signal to the memory control circuit 14, and the CCD control signal to the CCD drive control circuit 46, which in turn generates the CCD transfer control signal, CCD drive control signal and synchronization control signal in response to the CCD control signal.

Then, in step (7), the CCD drive control signal is applied to the timing signal generator 34 which generates the CCD drive timing signal. Thus, the CCD drive circuit 36 drives the line transferring CCD 32 in response to the CCD drive timing signal so as to scan the selected material according to the determined one line transferring distance and data sampling position. Meanwhile, the video synchronization signal generator 48 outputs the video synchronization signal to the memory control circuit 14 in response to the synchronization control signal. Hence, the memory control circuit 14 outputs the A/D conversion sampling pulse, write address signal and write signal in response to the video synchronization signal and memory control signal. Consequently, in step (7), the video signal of the material scanned by the line transferring CCD 32 is horizontally sampled in one line,, and the sampled signal is processed into the second R, G, and B video signal applied to the A/D converter 16.

In step (8), the A/D converter 16 converts the second R, G, and B video signals into the digital R, G, B video data in response to the A/D conversion sampling pulse. The digital R, G, and B video data is stored into the picture memory 18 in response to the write address signal and write signal of the memory control circuit 14.

In step (9), if it is not checked that the video data of one field or frame has been stored in the picture memory 18, the line transferring CCD 32 is transferred by the one line transferring distance determined in step (5) according to the size of the material so as to scan the material in step 10. In this case, the line transferring CCD 32 is transferred in response to the CCD transferring drive signal of the CCD transferring drive circuit 38. In step (10), after the line transferring CCD 32 is transferred by one line, the procedure is looped to step (6) so as to repeat the above step until the video data of one field or frame has been stored in the picture memory 18.

Meanwhile, if the video data of one field or frame has been stored in the picture memory 18 in step (9), the state of the picture memory 18 is monitored in step (11). Namely, the memory control circuit 14 delivers the read address signal and read signal to the picture memory 18 in response to the memory control signal, so as to cause the picture memory to output the stored video data of one field or frame. Hence, the video encoder 30 encodes the video data so as to produce the monitoring video signal through the video signal output 102, so that the user may monitor the state of the picture memory by means of a given monitoring device.

In step (12), if there is produced a printing command, the printing control signal is delivered to the printing control circuit 20 so as to print the video data of one field or frame stored in the picture memory 18 on a printing paper. In this case, the printing control circuit 20 generates the video data selection signal, printing signal, line memory control signal and intermediate tone control signal in response to the printing control signal. Thus, the memory control circuit 14 generates the read address signal and read signal in response to the printing signal, and the video data of one frame horizontally stored in the picture memory 18 is read out vertically by the read address signal and read signal delivered to the multiplexer 22.

The multiplexer 22 selects the R, G, and B video data in the order of B, G, and B in response to the video data selection signal. The line memory 24 receives stores the vertical video data in the order of B, G, and R. The intermediate control circuit 26 transforms in color the B, G, and R video data into Y, M, and C delivered to the print head circuit 28, which prints on a printing paper the image corresponding to the printing data received in the order of Y, M, and C in response to the print drive signal.

Figure 7:
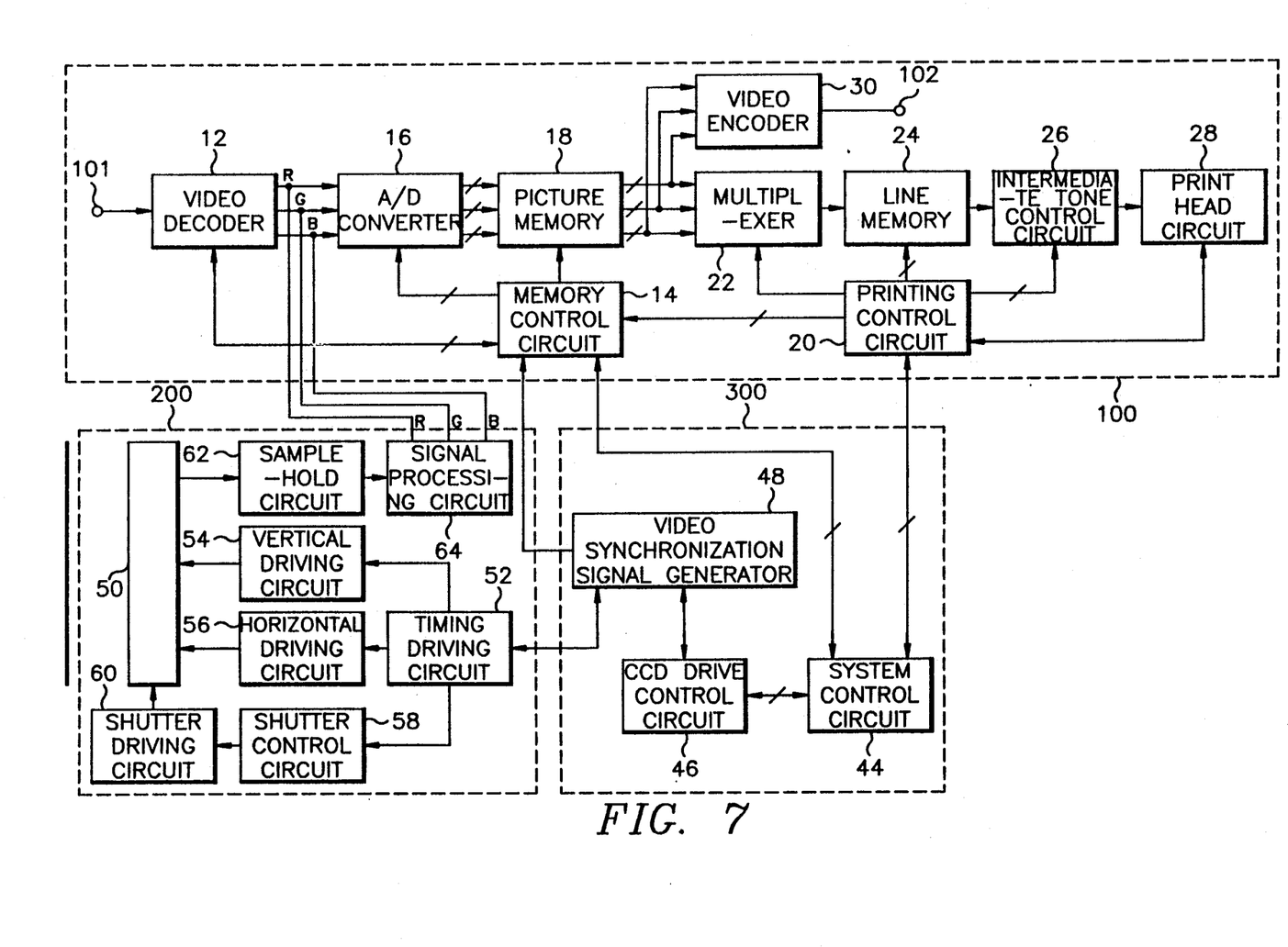
FIG. 7 is a block diagram for illustrating another embodiment of the inventive apparatus.

Another embodiment of the inventive image scanning and video printing apparatus is shown in FIG. 7, where the video printing unit 100 and system control unit 300 are the same with FIG. 3.

In this embodiment, the image scanning unit 200 differs from that of FIG. 3.

An interline transferring CCD 50 sequentially produces video signals obtained by scanning the full extent of a given material according to a shutter drive signal in response to a vertical drive signal and horizontal drive signal. A timing signal generator 52 generates a vertical drive control signal, horizontal drive control signal and shutter drive signal in response to the video synchronization signal of the video synchronization signal generator 48 of the system control unit 300. A vertical drive circuit 54 generates a vertical drive signal for vertically driving the interline transferring CCD in response to the vertical drive control signal. A horizontal drive circuit 56 generates a horizontal drive signal for horizontally driving the interline transferring CCD 50 in response to the horizontal drive control signal. A shutter control circuit 58 generates a shutter drive control signal for controlling the shutter drive of the interline CCD in response to the shutter control signal. A shutter drive circuit 60 generates a shutter drive signal for driving the shutter of the interline CCD 50 in response to the shutter drive control signal. A sample and hold circuit 62 sequentially samples and holds the scanned video signal of the interline CCD 50. A signal processing circuit 64 transforms the sampled and held video signal into the second R, G and B video signals.

Namely, the interline transferring CCD 50 scans the full extent of the material in response to the shutter drive signal, which differs from the line transferring CCD 32 for scanning the lines of the material one by one. This fully scanned data is sampled by the sample and hold circuit 62, processed the signal processing circuit 64 into the second R, G, and B signals applied to the A/D converter 16 of the video printing unit 100.

As stated above, the inventive image scanning and video printing apparatus may not only print the video signal of the video system such as a TV, camcorder, VTR, etc., but also a material such as a photograph, book, magazine, etc. by scanning. The image sensing device may be a line transferring or interline transferring CCD.

Moreover, the line transferring CCD may scan the material according to the size of the printing paper and the capacity of the picture memory, determine the one line transferring distance of the CCD and data sampling position according to the size of the material scanned, and dummy the region except the size of the material.

What is claimed is:

1. An image scanning and video printing apparatus, comprising:
    a first video signal input terminal for receiving a video signal from a video system as a first video signal;
    a video decoder for decoding said first video signal to produce first red, green and blue video signals and separating a vertical synchronizing signal and a horizontal synchronizing signal from said first video signal;
    a memory control circuit for receiving said vertical synchronizing signal and said horizontal synchronizing signal to generate analog/digital conversion sampling pulses, a write address signal and a write signal, and for receiving a printing signal to generate a read address signal and a read control signal, said memory control circuit being controlled by a video synchronization signal and a memory control signal;
    an analog/digital converter for selectively converting one of said first red, green and blue video signals and second red, green and blue signals in response to said analog/digital conversion sampling pulses so as to generate red, green and blue video data;
    a picture memory for storing said red, green and blue video data in response to said write address signal and said write signal and for providing the stored red, green and blue video data in response to said read address signal and said read control signal when one frame has been stored;
    a printing control circuit for producing said printing signal, a video data selection signal, a line memory control signal, an intermediate tone control signal and a printing drive signal in response to a printing control signal;
    a multiplexer for sequentially converting said stored red, green and blue video data in a parallel format to blue, green and red video data in a serial format in response to said video data selection signal;
    a line memory for transforming said blue, green and red video data into vertical video data in response to said line memory control signal;
    an intermediate tone control circuit for transforming said vertical video data into yellow, magenta and cyan printing data in response to said intermediate tone control signal;
    a print head circuit for printing a frame on a printing paper according to said printing drive signal and said yellow, magenta and cyan printing data;
    a video encoder for encoding the red, green and blue video data from said picture memory into a monitoring video signal;
    an image scanning unit for scanning with an image sensing charge coupled device in response to a charge coupled drive control signal and a charge coupled transfer control signal so as to produce said second red, green and blue video signals supplied to said analog/digital converter; and
    a system control unit for controlling said image scanning apparatus and said video printing apparatus by providing said charge coupled drive control signal, said charge coupled transfer control signal, said video synchronization signal, said memory control signal and said printing control signal.

2. An image scanning and video printing apparatus, as claimed in claim 1, wherein said image scanning unit, comprises:
    a line transferring charge coupled device for scanning to generate a scanned video signal in response to a charge coupled drive signal and a charge coupled transferring drive signal;
    a timing signal generator for generating a charge coupled drive timing signal for timing the driving of said line transferring charge coupled device;
    a charge coupled drive circuit for generating said charge coupled drive signal in response to said charge coupled drive timing signal;
    a charge coupled transferring drive circuit for generating said charge coupled transferring drive signal for transferring said line transferring charge coupled device in response to the charge coupled transfer control signal;
    a sample-hold circuit for sampling and holding said scanned video signal to generate a sampled and held video signal; and
    a signal processing circuit for processing said sampled and held video signal into said second red, green and blue signals.

3. An image scanning and video printing apparatus, as claimed in claim 2, wherein said system control unit, comprises:
    a system control circuit for generating said memory control signal, said printing control signal and said charge coupled control signal;
    a charge coupled drive control circuit for generating said charge coupled transfer control signal, said charge coupled drive control signal and said synchronization control signal in response to said charge coupled control signal; and
    a video synchronization signal generator for generating said video synchronization signal in response to said synchronization control signal.

4. An image scanning and video printing apparatus, as claimed in claim 1, wherein said image scanning unit comprises:
    an interline transferring charge coupled device for generating scanned video signals by scanning in response to a shutter drive signal, a vertical drive signal and a horizontal drive signal;
    a timing signal generator for generating a vertical drive control signal, a horizontal drive control signal and a shutter control signal in response to the video synchronization signal;

a vertical drive circuit for generating said vertical drive signal for vertically driving said interline transferring charge coupled device in response to said vertical drive control signal;

a horizontal drive circuit for generating said horizontal drive signal for horizontally driving said interline transferring charge coupled device in response to said horizontal drive control signal;

a shutter control circuit for generating a shutter drive control signal for controlling the shutter drive of said interline charge coupled device in response to said shutter control signal;

a shutter drive circuit for generating said shutter drive signal for driving a shutter of said interline charge coupled device in response to said shutter drive control signal;

a sample-hold circuit for sequentially sampling and holding said scanned video signal of said interline charge coupled device to generate a sampled and held video signal; and a signal processing circuit for transferring said sampled and held video signal into said second red, green and blue video signals.

5. A method of controlling the image scanning and video printing apparatus, said method comprising:

selecting one of video printing and scanning printing;

performing a video printing function if said video printing is selected;

determining a one line transferring distance and a data sampling position according to a capacity of a picture memory of said apparatus and a size of a material to be scanned if said scanning printing is selected;

performing a processing function including scanning said material with a charge coupled device in response to said one line transferring distance to generate a scanned video signal, sampling said scanned video signal according to said data sampling position to generate a sampled video signal, processing said sampled video signal to generate a processed signal, converting said processed signal to generate video data of one horizontal line, and storing said video data of one horizontal line in said picture memory;

checking whether video data of one frame has been stored in said picture memory;

transferring said charge coupled device by said one line transferring distance and repeating said processing function if less than one frame has been stored in said picture memory; and monitoring and printing the video data when said video data of one frame has been stored in said picture memory.

6. The method of controlling an image scanning and video printing apparatus as claimed in claim 5, wherein the charge coupled device is one of a line transferring type and a interline transferring type.

7. An image scanning and video printing apparatus, comprising:

image scanning means for generating scanned video signals by scanning a given material;

video printing means coupled to receive external video signals via an external video signal input terminal and responsive to said scanned video signals, for printing an image represented by one of said scanned video signals and said external video signals, said video printing means comprising; video decoder means for generating external red, green and blue video signals by decoding said external video signals;

converter means for converting one of said external red, green and blue video signals and said scanned video signals into selected red, green and blue video signals, said scanned video signals being received as scanned red, green and blue video signals from said image scanning means;

memory means for storing said selected red, green and blue video data to be read out as stored red, green and blue video data;

printing means for printing an image represented by said stored red, green and blue video data;

multiplexer means for multiplexing said stored red, green, and blue video data by alternately providing blue, green, and red components to generate multiplexed blue, green, and red video data; and line memory means for receiving and temporarily storing said multiplexed blue, green, and red video data, and for providing the temporarily stored multiplexed blue, green, and red video data to said printing means to compensate for a different processing speed of said printing means; and system control for controlling and synchronizing said image scanning means and said video printing means.

8. The image scanning and video printing apparatus as claimed in claim 7, wherein said image scanning means comprises:

line transferring charge-coupled means for generating said scanned video signals by scanning said given material in response to a charge-coupled drive signal and a charge-coupled transfer signal;

charge-coupled drive means for generating said charge-coupled drive signal in response to a charge-coupled timing signal;

timing signal generator means for generating said charge-coupled timing signal;

charge-coupled transfer means for generating said charge-coupled transfer signal to enable said line transferring charge-coupled means to transfer said scanned video signals on a line-by-line basis;

sample-and-hold means for sampling and holding said scanned video signals to generate sampled-and-held signals; and said processor means for processing said sampled-and-held signals into said scanned red, green and blue video signals.

9. The image scanning and video printing apparatus as claimed in claim 7, wherein said image scanning means comprises:

interline transferring charge-coupled means for generating said scanned video signals by scanning said given material in response to a shutter drive signal, vertical drive signal and horizontal drive signal;

timing signal generator means for generating vertical and horizontal control signals and a shutter control signal in response to a video synchronizing signal;

vertical drive means for generating said vertical drive signal for vertically driving said interline transferring charge-coupled means in response to said vertical control signal;

horizontal drive means for generating said horizontal drive signal for horizontally driving said interline transferring charge-coupled means in response to said horizontal drive control signal;

shutter control means for generating said shutter drive signal for driving a shutter of said interline charge-coupled means in response to said shutter control signal;

sample-and-hold means for sampling and holding said scanned video signals to generate sampled-and-held signals; and signal processor means for processing said sampled-and-held signals into said scanned red, green and blue video signals.

10. An apparatus as claimed in claim 7, wherein said video printing means comprises:

video decoder means for generating decoded video signals by decoding said external video signal;

analog-to-digital converter means for converting one of said decoded video signals and said scanned video signals into selected video data;

memory means for storing said selected video data to be red out as stored video data; and printing means for printing an image represented by said stored video data.

11. An apparatus as claimed in claim 10, wherein said video printing means further comprises:

multiplexer means for multiplexing said stored video data by alternately providing blue, green, and red components to generate multiplexed video data; and line memory means for receiving and temporarily storing said multiplexed video data, and for providing the temporarily stored multiplexed video data to said printing means to compensate for a different processing speed of said printing means.

12. A method for printing images from a scanner and a video signal input terminal, said method comprising:

selecting between functions of video printing and scanning printing;

performing video printing if the selected function is said video printing;

selecting a size of a material to be scanned in response to selection of said scanning printing;

determining a one line transferring distance and a data sampling position in response to the selected size, a picture memory capacity and an area of an image to be printed in response to selection of said scanning printing;

scanning said material with a charge-coupled device in accordance with said one line transferring distance to generate a scanned video signal, sampling said scanned video signal in accordance with said data sampling position to generate a sampled video signal, processing said sampled video signal to generate a processed video signal on a line-by-line basis to be stored on said picture memory;

checking whether the processed video signal of one frame has been stored in said picture memory;

transferring said charge-coupled device by said one line transferring distance in accordance with the selected size of said material; and printing the processed video signal when the processed video signal of said one frame has been stored on said picture memory.

13. The method for printing images claimed in claim 12, wherein said step of selecting said size comprises selecting one of a first size, a second size, and a third size.

14. The method for printing images claimed in claim 12, wherein if said selected size is larger than a medium on which said image is to be printed then said image is printed in a reduced size.

15. The method of claim 12, further comprised of:

making an initial selection of one of a first size, a second size and a third size of a material to be scanned, each characterized by a different surface area; and changing said initial selection to a different one of said first size, said second size and said third size if the surface area corresponding to said initial selection is larger than a medium for receiving an image to be printed during said scanning printing.

16. An image scanning and video printing apparatus, comprising:

image scanning means for generating scanned video signals by scanning a given material in response to scanning synchronizing signals;

system control means for generating said scanning synchronizing signals; and for generating video synchronization signals indicative of said scanning;

decoder means for decoding received composite video signals to generate decoded video signals;

picture memory means for storing one of said scanned video signals and said decoded video signals as stored video signals in response to write control signals, and for reading out said stored video signals in response to read control signals;

memory control means for generating said write control signals in response to received synchronizing signals contained in said received composite video signals when a video printer function is selected, for generating said write control signals in response to said video synchronization signals when a scanning printer function is selected, and for generating said read control signals in response a printing signal; and printing means for generating said printing signal, and for printing image represented by said stored video signals read out from said picture memory means.

17. An apparatus as claimed in claim 16, wherein said printing means comprises print control means for generating said printing signal and a line memory control signal; and line memory means for generating buffered video signals by buffering said stored video signals read out from said picture memory means in response to said line memory control signal; and print head means for printing in response to said buffered video signals.

* * * * *

UNITED STATES PATENT AND TRADEMARK OFFICE
CERTIFICATE OF CORRECTION

PATENT NO. : 5,311,331
DATED : 10 May 1994
INVENTOR(S) : Dong-Ill Cha

It is certified that error appears in the above-indentified patent and that said Letters Patent is hereby corrected as shown below:

| | | |
|---|---|---|
| Column 3 | Line 65, | after "and" ( the second occurrence), change "separate" to --separates--, |
| Column 4 | Line 3, | after "to", change "general" to --generate--, |
| Column 5 | Line 33, | after "S2", insert --S3,--, |
| | Line 39, | after comma " , ", change "an" to --and--, |
| Column 7 | Line 47, | after "line", delete the second comma " , " ; |
| Column 8 | Line 29, | preceding "in" (the second occurrence), change "B" to --R--; |

UNITED STATES PATENT AND TRADEMARK OFFICE
CERTIFICATE OF CORRECTION

Page 2 of 2

PATENT NO. : 5,311,331
DATED : 10 May 1994
INVENTOR(S) : Dong-Ill Cha

It is certified that error appears in the above-indentified patent and that said Letters Patent is hereby corrected as shown below:

IN THE CLAIMS

<u>Claim 8</u>

Column 12    Line 50,    preceding "processor", change "said" to --signal--,

<u>Claim 10</u>

Column 13    Line 23,    after "be", change "red" to --read--:

Signed and Sealed this

Fifteenth Day of October, 1996

Attest:

BRUCE LEHMAN

*Attesting Officer*    *Commissioner of Patents and Trademarks*